(12) United States Patent
Lee et al.

(10) Patent No.: US 10,505,203 B2
(45) Date of Patent: Dec. 10, 2019

(54) POSITIVE ELECTRODE OF LITHIUM-AIR BATTERY HAVING SIDE REACTION PREVENTION FILM TO WHICH METAL CATALYST IS PARTIALLY INTRODUCED, LITHIUM-AIR BATTERY HAVING SAME, AND MANUFACTURING METHOD THEREFOR

(71) Applicant: LG CHEM, LTD., Seoul (KR)

(72) Inventors: Dong Wook Lee, Daejeon (KR); Byung Gook Lyu, Daejeon (KR); Jae Sung Han, Daejeon (KR); Jong Hyun Chae, Daejeon (KR); Doo Kyung Yang, Daejeon (KR); Eun Kyung Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 2 days.

(21) Appl. No.: 15/743,387

(22) PCT Filed: Jan. 16, 2017

(86) PCT No.: PCT/KR2017/000535
§ 371 (c)(1),
(2) Date: Jan. 10, 2018

(87) PCT Pub. No.: WO2017/126855
PCT Pub. Date: Jul. 27, 2017

(65) Prior Publication Data
US 2018/0212256 A1 Jul. 26, 2018

(30) Foreign Application Priority Data

Jan. 20, 2016 (KR) ........................ 10-2016-0006885
Jan. 16, 2017 (KR) ........................ 10-2017-0007064

(51) Int. Cl.
*H01M 4/96* (2006.01)
*H01M 12/06* (2006.01)
(Continued)

(52) U.S. Cl.
CPC ............. *H01M 4/96* (2013.01); *H01M 4/382* (2013.01); *H01M 4/8605* (2013.01);
(Continued)

(58) Field of Classification Search
CPC ...... H01M 4/96; H01M 4/8817; H01M 4/382; H01M 4/8668; H01M 4/8657;
(Continued)

(56) References Cited

U.S. PATENT DOCUMENTS

| 2011/0269056 A1* | 11/2011 | Mizuno | ............... H01M 4/8605 |
|---|---|---|---|
| | | | 429/482 |
| 2012/0074908 A1* | 3/2012 | Rolison | ................. H01M 12/06 |
| | | | 320/127 |

(Continued)

FOREIGN PATENT DOCUMENTS

| EP | 0 154 468 A2 | 9/1985 |
|---|---|---|
| JP | 2009-181901 A | 8/2009 |

(Continued)

OTHER PUBLICATIONS

International Search Report (PCT/ISA/210) issued in PCT/KR2017/000535, dated May 4, 2017.
(Continued)

*Primary Examiner* — Ula C Ruddock
*Assistant Examiner* — Matthew W Van Oudenaren
(74) *Attorney, Agent, or Firm* — Birch, Stewart, Kolasch & Birch, LLP

(57) ABSTRACT

The present invention relates to a positive electrode of a lithium-air battery having a side reaction prevention layer with a partially introduced metal catalyst, and a method for preparing the same, and in particular, to a positive electrode of a lithium-air battery having a side reaction prevention layer with a metal catalyst sporadically partially introduced to a surface thereof, and a method for preparing the same. The lithium-air battery according to the present invention suppresses a side reaction at an interface between a positive electrode active material and an electrolyte thereby effectively reduces an overvoltage when charged, and therefore,
(Continued)

does not cause liquid electrolyte decomposition, which is effective in enhancing a cycle life.

11 Claims, 3 Drawing Sheets

(51) Int. Cl.
H01M 4/38 (2006.01)
H01M 4/86 (2006.01)
H01M 4/88 (2006.01)

(52) U.S. Cl.
CPC ....... *H01M 4/8652* (2013.01); *H01M 4/8657* (2013.01); *H01M 4/8668* (2013.01); *H01M 4/8673* (2013.01); *H01M 4/8817* (2013.01); *H01M 12/06* (2013.01); *H01M 2004/8689* (2013.01)

(58) Field of Classification Search
CPC .............. H01M 4/8652; H01M 4/8605; H01M 4/8673; H01M 12/06; H01M 2004/8689
See application file for complete search history.

(56) References Cited

U.S. PATENT DOCUMENTS

| | | | | |
|---|---|---|---|---|
| 2013/0089796 | A1* | 4/2013 | Sun | H01M 12/06 429/406 |
| 2013/0143133 | A1* | 6/2013 | Barde | H01M 4/381 429/405 |
| 2013/0216922 | A1* | 8/2013 | Zheng | H01M 4/9041 429/405 |
| 2016/0190606 | A1 | 6/2016 | Kim et al. | |

FOREIGN PATENT DOCUMENTS

| | | | |
|---|---|---|---|
| JP | 2009181901 | * | 8/2009 |
| JP | 2014-75269 | A | 4/2014 |
| KR | 10-2009-0076276 | A | 7/2009 |
| KR | 10-1227796 | B1 | 1/2013 |
| KR | 10-1309577 | B1 | 9/2013 |
| KR | 10-2014-0030482 | A | 3/2014 |
| KR | 10-2014-0039755 | A | 4/2014 |
| KR | 10-2014-0052139 | A | 5/2014 |
| KR | 10-2015-0022095 | A | 3/2015 |
| KR | 10-2015-0031213 | A | 3/2015 |
| KR | 10-2015-0104674 | A | 9/2015 |
| WO | WO 2012/040738 | A1 | 3/2012 |

OTHER PUBLICATIONS

Lu et al., "A nanostructured cathode architecture for low charge overpotential in lithium-oxygen batteries", Nature Communications, vol. 4, No. 2383, Aug. 29, 2013, pp. 1-9.

Luo et al., "Pd nanoparticles on ZnO-passivated porous carbon by atomic layer deposition: an effective electrochemical catalyst for Li—$O_2$ battery", Nanotechnology, vol. 26, No. 164003, 2015, pp. 1-9.

European Search Report for Appl. No. 17741621.1 dated Mar. 2, 2018.

* cited by examiner

[Figure 1]
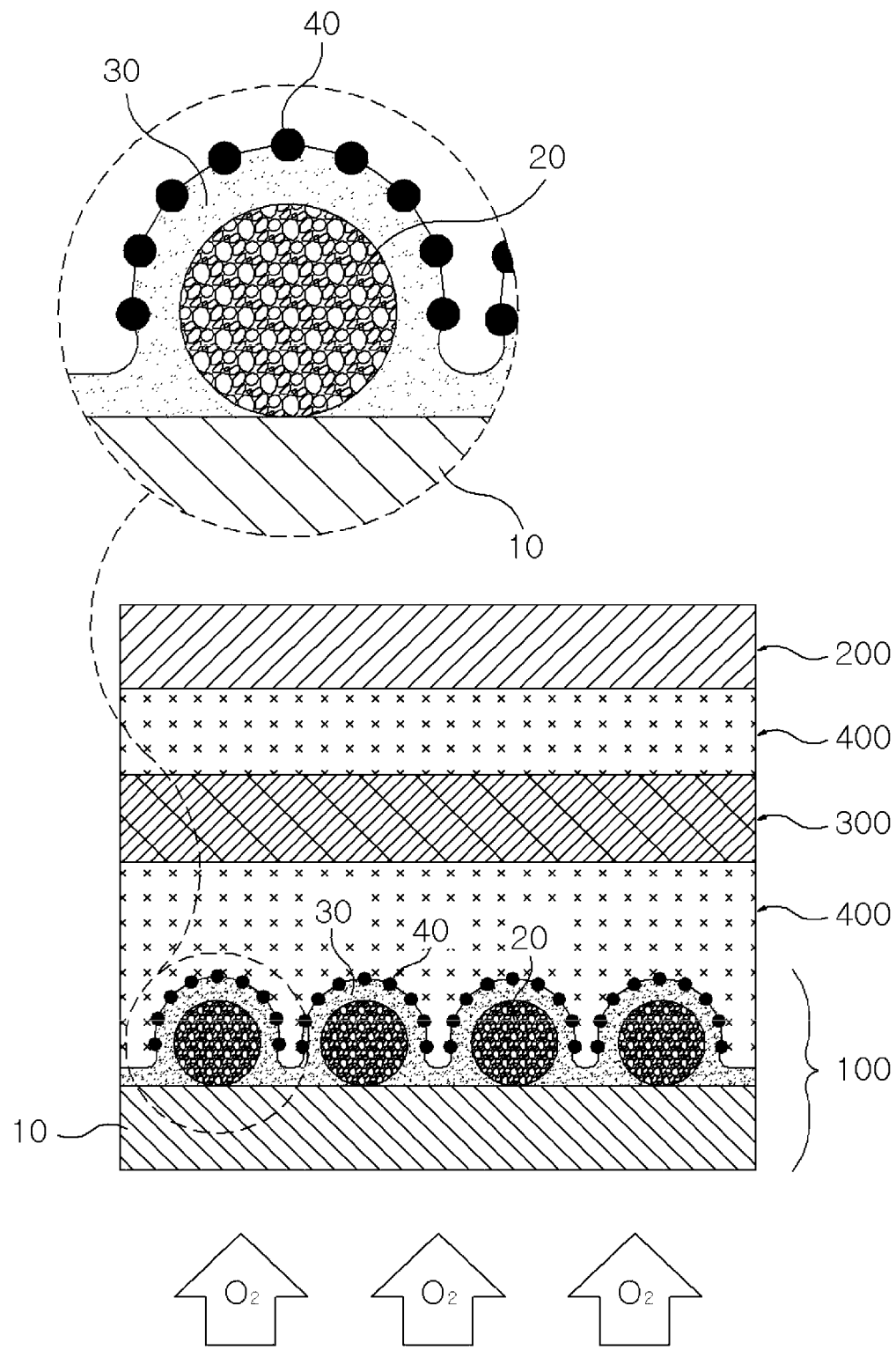

[Figure 2]
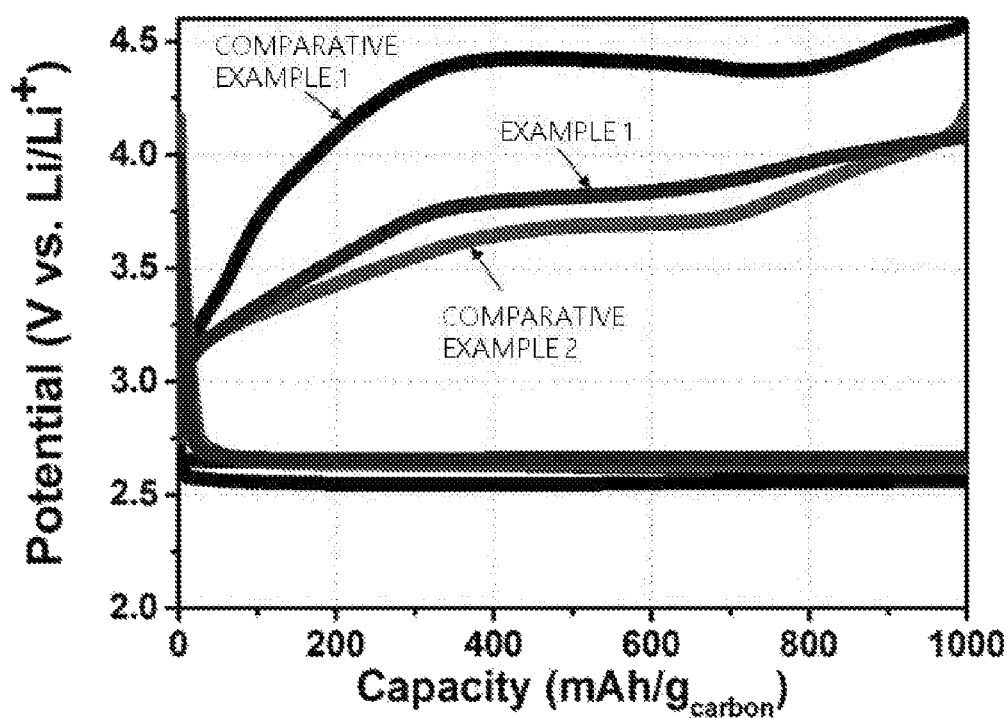

[Figure 3]
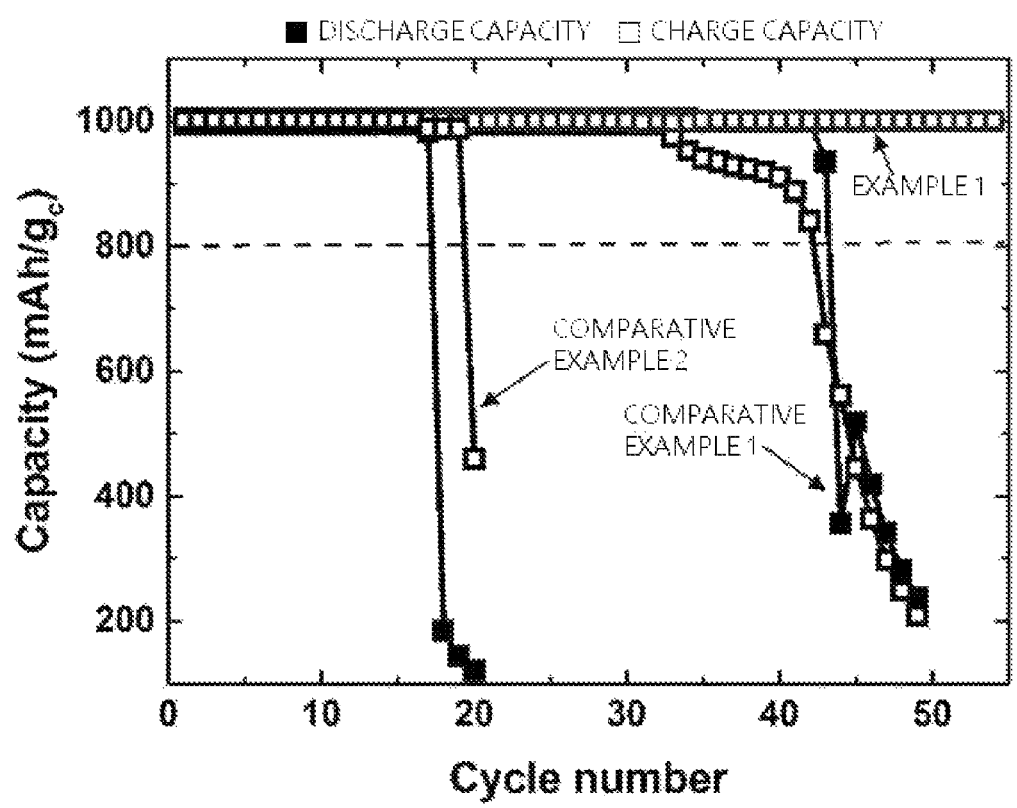

POSITIVE ELECTRODE OF LITHIUM-AIR BATTERY HAVING SIDE REACTION PREVENTION FILM TO WHICH METAL CATALYST IS PARTIALLY INTRODUCED, LITHIUM-AIR BATTERY HAVING SAME, AND MANUFACTURING METHOD THEREFOR

TECHNICAL FIELD

This application claims priority to and the benefits of Korean Patent Application No. 10-2016-0006885, filed with the Korean Intellectual Property Office on Jan. 20, 2016, and Korean Patent Application No. 10-2017-0007064, filed with the Korean Intellectual Property Office on Jan. 16, 2017, the entire contents of which are incorporated herein by reference.

The present invention relates to a positive electrode of a lithium-air battery having a side reaction prevention layer with a metal catalyst sporadically partially introduced to a surface thereof, and a method for preparing the same.

BACKGROUND ART

A metal-air battery is a battery using a metal such as lithium (Li), zinc (Zn), aluminum (Al), magnesium (Mg), iron (Fe), calcium (Ca) and sodium (Na) in a metal electrode (negative electrode) and using oxygen in the air as a positive electrode active material. In addition, a metal-air battery produces electricity by reacting metal ions of a negative electrode with oxygen, and unlike existing secondary batteries, does not necessarily have a positive electrode active material inside the battery in advance, which makes weight lightening possible. In addition, a negative electrode material may be stored in large quantities in the container, and theoretically high capacity and high energy density may be obtained.

A metal-air battery is formed with a metal electrode (negative electrode) and an oxygen air electrode (positive electrode). When discharged, metal ions are formed due to oxidation of the metal electrode, and the produced metal ions migrate to the oxygen air electrode through an electrolyte. In the oxygen air electrode, external oxygen is dissolved in the electrolyte inside the pores of the oxygen positive electrode and is reduced.

Particularly among metal-air batteries, a lithium-air battery is generally provided with a negative electrode capable of intercalating/deintercalating lithium ions, and a positive electrode including a redox catalyst of oxygen with oxygen in the air as a positive electrode active material, and is provided with a lithium ion conductive medium between the positive electrode and the negative electrode. Theoretical energy density of a lithium-air battery is 3000 Wh/kg or greater, and this corresponds to energy density of approximately 10 times compared to lithium ion batteries. Moreover, a lithium-air battery is environmental-friendly, and is capable of providing more improved safety compared to lithium ion batteries, and therefore, much developments have been progressed.

Important factors determining electrochemical properties of a lithium-air battery include an electrolyte system, a positive electrode structure, an excellent air reduction electrode catalyst, types of a carbon support, an oxygen pressure and the like, and a formula of the reaction occurring in a lithium-air secondary battery is as shown in the following Reaction Formula 1.

Oxidation electrode: Li(s)↔Li⁺+e⁻ 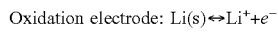

Reduction electrode: 4Li+O$_2$→2Li$_2$OV=2.91 V 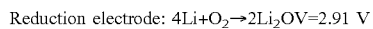

2Li+O$_2$→Li$_2$O$_2$V=3.10 V  [Reaction Formula 1]

In other words, lithium produced from a negative electrode during discharge meets oxygen gas of a positive electrode to produce lithium oxide, and the oxygen is reduced (oxygen reduction reaction: ORR) to generate oxygen anions. On the contrary, lithium oxide is reduced during charge, and oxygen gas is produced while oxygen is oxidized (oxygen evolution reaction: OER).

The solid lithium oxide produced during discharge is not favorably dissolved in an organic solvent and is present as a solid oxide. It is accumulated in a reaction site of a carbon electrode, a positive electrode, blocking oxygen channels and inhibiting diffusion of oxygen. In other words, the solid lithium oxide blocks pores of carbon, a positive electrode, as well as inhibiting contact between oxygen and lithium ions making lithium oxide formation difficult, and therefore, capacity is difficult to be revealed and secondary battery properties decline. In addition, charge transfer is inhibited during charge due to a side reaction deposit forming high resistance and overvoltage, and this leads to a liquid electrolyte decomposition reaction causing a problem of battery degradation.

PRIOR ART DOCUMENTS

Korean Patent Application Laid-Open Publication No. 10-2015-0022095, "Positive electrode material for metal air battery, and metal air battery including the same"

DISCLOSURE

Technical Problem

As described above, a solid lithium oxide and a side reaction deposit of a lithium-air battery increase an overvoltage when charged lowering charge and discharge energy efficiency and causing solvent decomposition in a liquid electrolyte, and such a reaction normally occurs in defects on a carbon-based conductor surface. In order to prevent such a reaction, metal or metal oxide-based catalysts are normally used, however, problems are still present.

Accordingly, an aspect of the present invention provides a lithium-air battery having a reduced charging overvoltage and an improved cycle life by fundamentally blocking an interface between a carbon-based conductor and a liquid electrolyte.

Technical Solution

According to an aspect of the present invention, there is provided a positive electrode for a lithium-air battery including a carbon-based conductor coated on one surface of a porous current collector; a side reaction prevention layer coated on a surface of the carbon-based conductor; and a metal catalyst sporadically partially introduced to a surface of the side reaction prevention layer, wherein the side reaction prevention layer is a conductive metal oxide.

According to another aspect of the present invention, there is provided a lithium-air battery including the positive electrode.

According to another aspect of the present invention, there is provided a method for preparing a positive electrode for a lithium-air battery including i) coating a carbon-based conductor on a porous current collector; ii) depositing a side reaction prevention layer on a surface of the carbon-based conductor; and iii) introducing a metal catalyst to the side reaction prevention layer, wherein the side reaction prevention layer includes a conductive metal oxide.

Advantageous Effects

A lithium-air battery according to the present invention suppresses a side reaction at an interface between a conductive carbon surface and an electrolyte and thereby does not cause liquid electrolyte decomposition, which leads to long-term stabilization and enhancement in the cycle life. In addition, by catalyst particles additionally loaded on a side reaction prevention layer surface, an overvoltage is effectively reduced, and an effect of suppressing liquid electrolyte decomposition caused by a high voltage is obtained.

DESCRIPTION OF DRAWINGS

FIG. 1 is a sectional image schematically illustrating a lithium-air battery of the present invention.

FIG. 2 shows data comparing charge and discharge curves of Example 1 and Comparative Examples 1 and 2 according to the present invention.

FIG. 3 shows data comparing cycle capacity of Example 1 and Comparative Examples 1 and 2 according to the present invention.

BEST MODE

The present invention aims to facilitate an oxidation and reduction reaction of oxygen by coating a surface of a carbon-based conductor, a positive electrode active material, with a side reaction prevention layer to block a contact with a liquid electrolyte, and introducing a metal catalyst thereto.

Hereinafter, preferred examples of the present invention will be described in detail with reference to accompanying illustrative drawings. Such drawings correspond to one embodiment for describing the present invention, may be implemented in various different forms, and are not limited to the present specification. In the drawings, parts not relevant to the descriptions are not included in order to clearly describe the present invention, and like reference numerals are used for like elements throughout the specification. In addition, sizes and relative sizes of constituents shown in the drawings are unrelated to actual scales, and may be reduced or exaggerated for clarity of the descriptions.

In the present specification, a numerical range expressed using expresses a range including values written before and after [~] as a minimum value and a maximum value, respectively. In addition, in the present specification, [combination thereof] is a meaning including, unless stated otherwise, both mixing or combining two or more and applying these as one element, and applying each as an individual element, and each combination is considered as one type regardless of the application type.

Positive Electrode for Lithium-Air Battery

FIG. 1 is a sectional diagram schematically illustrating a lithium-air battery provided in the present invention. When referring to this diagram to provide more specific descriptions, in the lithium-air battery formed including a positive electrode (100), a negative electrode (200), a separator (300) provided therebetween and a liquid electrolyte (400), the positive electrode (100) has a structure including a porous current collector (10); a carbon-based conductor (20) coated on one surface of the porous current collector (10); a side reaction prevention layer (30) coated on a surface of the carbon-based conductor (20); and a metal catalyst (40) sporadically partially introduced to a surface of the side reaction prevention layer (30).

In the present invention, introduced means, by electrostatic attraction or Van der Waals attraction between the side reaction prevention layer (30) and the metal catalyst (40), the metal catalyst (40) being led to the side reaction prevention layer (30) and being loaded as if being buried, or being coated.

The porous current collector (10) of the present invention is a porous current collector having gas permeability, and may preferably include porous carbon pulp and porous carbon paper, and in addition thereto, may include porous three-dimensional current collectors such as foamed metal, metal fiber, porous metal, etched metal or metal having unevenness front and back, non-woven fabric, or the like. In addition, multiple pores may also be present inside the carbon-based conductor (20), and such pores have multiple active sites, a large pore volume and a high specific surface area by increasing permeability of air including oxygen, which is preferred in providing a positive electrode active site.

In the present invention, the carbon-based conductor (20) is a nano unit-sized particle or structure, and using porous carbon powder or carbon structure having a large specific surface area and high electric conductivity is preferred. Examples thereof preferably include one type selected from the group consisting of graphite-based, active carbon-based, carbon black-based, carbon fiber-based, carbon nanostructure and combinations thereof, but are not limited thereto.

Particularly, by coating the carbon-based conductor (20) described above using a conductive metal oxide as the side reaction prevention layer (30) in the present invention, deposition of side reaction products is to be suppressed through physically blocking the carbon-based conductor (20) with the liquid electrolyte (400). When the surface is modified by coating with such a conductive metal oxide, a low resistance property at the interface contributes to battery performance enhancement in addition to the interfacial reaction with the electrolyte.

The conductive metal oxide according to the present invention may include one or more types selected from the group consisting of indium tin oxide (ITO), indium zinc oxide (IZO), antimony tin oxide (ATO), fluoro tin oxide (FTO), aluminum zinc oxide (AZO), magnesium indium oxide, gallium zinc oxide (GZO), gallium indium oxide, indium gallium zinc oxide (IGZO), niobium strontium titanium oxide (Nb-STO), indium cadmium oxide, boron zinc oxide (BZO), SZO($SiO_2$—ZnO), indium oxide ($In_2O_3$) and combinations thereof, and preferably, indium tin oxide (ITO) or indium zinc oxide (IZO) is used.

Among the conductive metal oxides, transparent conductive oxides (TCO) having a large band gap, a low resistance value and high permeability in a visible region such as indium tin oxide (ITO) or indium zinc oxide (IZO) are used in solar cells, touch panels, heat mirrors, organic electroluminescence devices (OLED) and liquid crystal displays (LCD), and although these are metal oxides, they have electric conductivity equivalent to metals, and carbon defect portions are completely covered enabling physical blocking with the liquid electrolyte (400) while providing conductivity to a positive electrode, and therefore, these are most preferred as the side reaction prevention layer (30) of the present invention.

In addition, the side reaction prevention layer (30) preferably has a thickness in a range of 5 nm~30 nm, and the thickness being less than 5 nm has a risk of the carbon-based conductor (20) being exposed to the liquid electrolyte (400), and the thickness being greater than 30 nm changes structures and reduces sizes of micropores of the carbon-based conductor (20) making it difficult to load large quantities of discharge products (for example $Li_2O_2$).

As the metal catalyst (40) of the present invention, known metals or metal compounds capable of weakening or destroying lithium oxide ($Li_2O_2$ or $Li_2O$) bonds produced when discharged are preferably used. For example, the metal catalyst (40) is ruthenium (Ru), palladium (Pd), platinum (Pt), gold (Au), nickel (Ni), copper (Cu), silver (Ag), zinc (Zn), lead (Pb), cadmium (Cd), tin (Sn), titanium (Ti) and an alloy thereof, an oxide thereof, a sulfide thereof or a selenide thereof, and preferably, ruthenium oxide ($RuO_2$) is used.

The metal catalyst (40) is included in 10~50 parts by weight with respect to 100 parts by weight of the carbon-based conductor (20), and as such a metal catalyst (40), using those having an average particle diameter of 1 nm~10 nm is preferred in securing effects of the present invention.

Method for Preparing Positive Electrode for Lithium-Air Battery

A positive electrode for a lithium-air battery having the constituents described above may be prepared through i) coating a carbon conductor on a porous current collector; ii) depositing a conductive metal oxide on a surface of the carbon conductor as a side reaction prevention layer so as to include the carbon conductor; and iii) introducing a metal catalyst to the side reaction prevention layer. Hereinafter, each step will be described in detail.

First, a carbon conductor is coated on a porous current collector. The carbon-based conductor described above and a binder are mixed in a weight ratio of 9:1~7:3, and the result is dispersed into a solvent to prepare a slurry composition, and then the composition may be coated on a porous current collector and dried.

The binder performs a role of facilitating binding between the carbon-based conductors, and fixing these on a current collector. In the present invention, the types are not particularly limited, and any binder known in the art may be used. For example, one type may be selected from the group consisting of acryl-based binders, fluorine resin-based binders, rubber-based binders, cellulose-based binders, polyalcohol-based binders, polyolefin-based binders, polyimide-based binders, polyester-based binders, silicone-based binders and combinations thereof. More specifically, polytetrafluoroethylene (PTFE), polyvinylidene fluoride (PVDF), a copolymer thereof or cellulose may be used, and even more preferably, polyvinylidene fluoride (PVDF) may be used.

As a solvent for forming the slurry, water or an organic solvent may be used, and as the organic solvent, one type selected from the group consisting of isopropyl alcohol, N-methyl-2-pyrrolidone (NMP), acetone and combinations thereof may be used.

Methods of coating on the porous base are not limited, and coating may be carried out using methods such as doctor blade coating, dip coating, gravure coating, slit die coating, spin coating, comma coating, bar coating, reverse roll coating, screen coating or cap coating.

In addition, after the coating, the result may be dried for 12 hours-36 hours in a vacuum oven heated to 100° C.~150° C. By evaporating the solvent included in the slurry through the drying, binding strength between the carbon-based conductor and the current collector is facilitated and the carbon-based conductor is evenly dispersed even into the inside frame of the porous current collector for binding.

Next, a side reaction prevention layer is formed by depositing a conductive metal oxide over the whole porous current collector surface so as to include the coated carbon-based conductor. Preferably, one type selected from among the conductive metal oxides described above is dry deposited on the carbon-based conductor-coated porous current collector, and as one example, a method of sputtering or thermal evaporation deposition may be used for the deposition.

More specifically, ion beam sputtering, DC-sputtering, RF-sputtering or thermal evaporation deposition may be used for the deposition, and such methods have high deposition rates at room temperature, release nontoxic gases, have operating easiness, have safety and the like, and deposition on large-area substrates may be achieved. In addition, such methods have advantages of readily controlling a side reaction prevention layer thickness, being low-priced compared to an atomic layer deposition (ALD) method, and mass producing relatively even deposition surfaces.

Next, a positive electrode for a lithium-air battery is prepared by introducing a metal catalyst to the side reaction prevention layer. Methods of introducing a metal catalyst to the side reaction prevention layer are not limited, and as one example, a metal oxide may be introduced through repeating a process of immersing the prepared side reaction prevention layer-coated carbon-based conductor into a beaker filled with a metal precursor, and then immersing in distilled water. A metal oxide may be introduced through a simple process of obtaining metal cations in the beaker filled with a metal precursor, and obtaining oxygen anions in distilled water.

A positive electrode prepared through the above-mentioned process is readily introduced to a lithium-air battery and fundamentally blocks a contact between an electrolyte and the carbon-based conductor.

Lithium-Air Battery

As illustrated in FIG. 1, the present invention provides a lithium-air battery including a positive electrode (100); a negative electrode (200); a separator (300) provided therebetween and a liquid electrolyte (400) impregnated thereinto. The lithium-air battery according to one embodiment of the present invention includes a separator provided on at least one surface of the porous coating layer according to the embodiments described above, and may have common constitutions and components of metal-air batteries. Herein, in the positive electrode (100), one surface of a porous current collector (10) on which a carbon-based conductor (20), a side reaction prevention layer (30) and a metal catalyst (40) are formed is preferably disposed to be impregnated into the liquid electrolyte (400).

When operating a lithium-air battery, a side reaction occurs by the electrodes (100, 200) and the liquid electrolyte (400) adjoining thereto. In other words, lithium ions and a solvent in the liquid electrolyte react to produce a lithium carbonate or lithium carboxylate material, and this causes battery property decline. The side reaction normally occurs in the positive electrode (100) rather than in the negative electrode (200). Accordingly, by disposing the side reaction prevention layer (30) and the metal catalyst (40) to be impregnated into the liquid electrolyte (400) in the present invention, the side reaction occurring in the positive electrode (100) is suppressed or decomposition of the produced reactant is facilitated. Moreover, an effect of enhancing electrochemical reactivity of the metal catalyst (40) itself is obtained resultantly enhancing a cycle property while increasing battery capacity of a lithium-air battery.

FIG. 1 schematically illustrates a sectional structure of a lithium-air battery according to one embodiment of the present invention. Herein, those known in the art may be used as the positive electrode, the negative electrode and the electrolyte.

The lithium-air battery of the present invention uses the positive electrode (100) described above, and although the thickness of the positive electrode (100) is not particularly limited, the thickness may be preferably 10 μm~100 μm, and more preferably, the thickness of the positive electrode may be 20 μm~60 μm.

According to one embodiment of the present invention, a negative electrode active material of the negative electrode (200) may be selected from the group consisting of lithium metal, lithium metal-based alloys, lithium compounds and lithium intercalation materials.

Particularly, the lithium metal-based alloy may be an alloy of lithium and one or more materials selected from the group consisting of, for example, Na, K, Rb, Cs, Fr, Be, Ma, Ca, Sr, Ba, Ra, Al and Sn, and the lithium compound may be a material reversibly forming a lithium-containing compound by reacting with lithium ions, and for example, may be tin oxide ($SnO_2$), titanium nitrate (TiN) or Recon. In addition, the lithium intercalation material means a material capable of reversibly intercalating or deintercalating lithium ions, and for example, may be crystalline carbon, amorphous carbon or a mixture thereof.

The thickness of the negative electrode (200) is not particularly limited, but may be 50 μm or greater. The upper limit of the negative electrode is not particularly limited, and it is more favorable as the thickness becomes larger, however, considering commercialization potential, the thickness of the negative electrode may be 50 μm~500 μm.

A common separator (300) may be provided between the positive electrode (100) and the negative electrode (200). The separator (300) has a function of physically separating the electrodes, and those commonly used as a separator may be used without particular limit. Particularly, those having low resistance for ion migration of the liquid electrolyte, and having an excellent liquid electrolyte moisture-containing ability are preferred.

In addition, the separator (300) enables lithium ion transport between the positive electrode and the negative electrode while separating and insulating the positive electrode (100) and the negative electrode (200). Such a separator (300) is porous and may be formed with non-conductive or insulating materials. The separator may be an independent member such as a film, or a coating layer added to the positive electrode and/or the negative electrode.

Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used either alone or as laminates thereof, or common porous non-woven fabrics, for example, non-woven fabrics made of high melting point glass fiber or polyethylene terephthalate fiber may be used, however, the separator is not limited thereto.

According to one embodiment of the present invention, the liquid electrolyte (400) is a non-aqueous liquid electrolyte including an ionizable lithium salt and an organic solvent. For example, as the solvent of the non-aqueous liquid electrolyte, carbonate such as ethylene carbonate (EC) or propylene carbonate (PC), chain carbonate such as diethylene carbonate, ethers such as 1,2-dioxane, nitriles such as acetonitrile (AN), or amides may be used, however, the solvent is not limited thereto. These may be used either alone or as a combination of a plurality of these.

In addition, as the lithium salt, one, two or more selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, LiF, LiBr, LiCl, LiI and $LiB(C_2O_4)_2$, $LiCF_3SO_3$, $LiN(SO_2CF_3)_2$(Li-TFSI), $LiN(SO_2C_2F_5)_2$ and $LiC(SO_2CF_3)_3$ may be used, however, the lithium salt is not limited thereto. The lithium salt may be used in a concentration of 0.1 M~2.0 M range. When the lithium salt concentration is included in the above-mentioned range, an electrolyte has proper conductivity and viscosity, and therefore, excellent electrolyte performance may be exhibited and lithium ions may effectively migrate.

The form of the lithium-air battery according to the present invention is not limited, and may be, for example, a coin-type, a plane-type, a cylinder-type, a horn-type, a button-type, a sheet-type or a laminate-type. In addition, the lithium-air battery according to the present invention may be used in both metal primary batteries and metal secondary batteries. The lithium-air battery may also be used in large-size batteries used in electric vehicles and the like. Furthermore, a battery module including the lithium-air battery according to the present invention as a unit cell may be manufactured.

Hereinafter, the present invention will be more specifically described with reference to examples, however, the following examples do not limit the scope of the present invention, and are to be construed as for illuminating the present invention.

Example 1

Step 1. Coating Positive Electrode Active Material on Porous Current Collector

To 0.8 g of a carbon-based conductor (CNT), 1.695 g of kf1100 dissolving a binder (PVDF) in a N-methyl-2-pyrrolidone (NMP) solvent was added to prepare primary slurry so that the conductor to the binder ratio became 8:2. After that, 25 g of N-methyl-2-pyrrolidone (NMP) was additionally added to prepare secondary slurry that is coatable. Blade coating was carried out on carbon paper using the secondary slurry. After the coating, the result was dried for 24 hours or longer in a vacuum oven heated to 120° C. in advance.

Step 2. Coating Side Reaction Prevention Layer

In order to coat an indium tin oxide (ITO) layer as a side reaction prevention layer, a sputtering process was used. The deposition process was progressed at room temperature, and was progressed so as to have a thickness of approximately 10 nm under argon (Ar) atmosphere.

Step 3. Metal Catalyst Introduction

In order to introduce a ruthenium oxide catalyst, a ruthenium precursor solution was prepared. In a beaker, a precursor solution dissolving ruthenium chloride ($RuCl_2$) in distilled water so as to have a concentration of 10 mM was prepared. In another beaker, the distilled water was prepared in the same amount, and heated to 60° C.

In Step 2, a process of immersing and taking out the side reaction prevention layer-coated positive electrode in an aqueous solution including ruthenium ions and in distilled water heated to 60° C. for 15 seconds and 30 seconds, respectively, was repeated 5 times. A separate washing process was not included since oxygen anions are loaded from the distilled water. The metal catalyst-introduced positive electrode for a lithium-air battery was dried for 24 hours or longer in a vacuum oven heated to 120° C. in advance.

Step 4. Manufacture of Lithium-Air Battery

Using the positive electrode prepared in Step 3, a lithium-ion battery was assembled in a coin cell form in a glove box under argon (Ar) atmosphere. On a perforated lower plate made of stainless steel, a positive electrode, a separator (glass fiber), a lithium negative electrode, a gasket, a stainless steel coin, a spring and an upper plate were placed in order, and a pressure was applied to assemble a coin cell. As a liquid electrolyte, 1 M LiTFSI-dissolved tetraethylen glycol dimethyl ether (TEGDME) was used.

Comparative Example 1

A lithium-air battery was manufactured in the same manner as in Example 1 (except Step 2 and Step 3) using a positive electrode coating only the carbon-based conductor.

Comparative Example 2

A lithium-air battery was manufactured in the same manner as in Example 1 (except Step 2) using a positive electrode coating ruthenium oxide, a metal catalyst, on the carbon-based conductor.

Experimental Example 1

For the completed coin cells, a charge and discharge experiment was progressed under oxygen atmosphere of 1 atmosphere. The charge and discharge experiment was progressed at a charge/discharge rate of 0.3 C/0.1 C based on 1,000 mAh/g capacity with respect to the carbon weight. Comparison of charge and discharge curves and cycle capacity between the lithium-air batteries using the carbon-based conductor (CNT) positive electrode and the positive electrode loaded with the side reaction prevention layer and the catalyst layer is shown in FIG. 2 and FIG. 3.

When examining the charge and discharge curves in FIG. 2, the lithium-air battery of Example 1 had a lower voltage compared to the lithium-air battery of Comparative Example 1, and therefore, a decrease in the overvoltage was identified, and although a somewhat higher overvoltage was measured compared to Comparative Example 2, this turned out to be negligible. In addition, when examining the cycle capacity curves of FIG. 3, discharge capacity of Comparative Example 1 was greatly reduced when 30 cycles were progressed, and in Comparative Example 2, discharge capacity was greatly reduced even before progressing 20 cycles, whereas in Example 1, it was identified that initial discharge capacity was maintained until 50 cycles were progressed.

Hereinbefore, preferred Example 1 of the present invention have been described in detail, however, the scope of a right of the present invention is not limited thereto, and various modifications and improvements made by those skilled in the art using basic concepts of the present invention defined in the attached claims also belong to the scope of a right of the present invention.

A battery pack including the lithium-sulfur battery may be used as a power supply of electric vehicles (EV), hybrid electric vehicles (HEV) and plug-in hybrid electric vehicles (PHEV), or systems for power storage.

The invention claimed is:

1. A positive electrode for a lithium-air battery comprising:
    a porous current collector;
    a carbon-based conductor and binder coated directly on a surface of the porous current collector;
    a side reaction prevention layer coated directly on an outer surface of the carbon-based conductor; and
    a metal catalyst sporadically on an outer surface of the side reaction prevention layer,
    wherein the side reaction prevention layer includes a conductive metal oxide.

2. The positive electrode for a lithium-air battery of claim 1, wherein the conductive metal oxide includes one type selected from the group consisting of indium tin oxide, indium zinc oxide, antimony tin oxide, fluorinated tin oxide, aluminum zinc oxide, magnesium indium oxide, zinc gallium oxide, gallium indium oxide, indium-gallium-zinc oxide, niobium-strontium-titanium oxide, indium cadmium oxide, BZO, SZO, indium oxide and combinations thereof.

3. The positive electrode for a lithium-air battery of claim 1, wherein the side reaction prevention layer has a thickness of 5 nm~30 nm.

4. The positive electrode for a lithium-air battery of claim 1, wherein the carbon-based conductor includes one type selected from the group consisting of graphite-based, active carbon-based, carbon black-based, carbon fiber, carbon nanostructures and combinations thereof.

5. The positive electrode for a lithium-air battery of claim 1, wherein the metal catalyst is ruthenium, palladium, platinum, gold, nickel, copper, silver, zinc, lead, cadmium, tin, titanium and an alloy thereof, an oxide thereof, a sulfide thereof or a selenide thereof.

6. The positive electrode for a lithium-air battery of claim 1, wherein the metal catalyst is included in 10~50 parts by weight with respect to 100 parts by weight of the carbon-based conductor.

7. The positive electrode for a lithium-air battery of claim 1, wherein the metal catalyst has an average particle diameter of 1 nm~10 nm.

8. A method for preparing a positive electrode for a lithium-air battery comprising:
    i) coating a carbon-based conductor and binder directly on a porous current collector;
    ii) depositing a side reaction prevention layer directly on an outer surface of the carbon-based conductor; and
    iii) introducing a metal catalyst on an outer surface of the side reaction prevention layer,
    wherein the side reaction prevention layer includes a conductive metal oxide.

9. The method for preparing a positive electrode for a lithium-air battery of claim 8, wherein the deposition in ii) is carried out using sputtering or thermal evaporation deposition.

10. The method for preparing a positive electrode for a lithium-air battery of claim 8, wherein the conductive metal oxide includes one type selected from the group consisting of indium tin oxide, indium zinc oxide, antimony tin oxide, fluorinated tin oxide, aluminum zinc oxide, magnesium indium oxide, zinc gallium oxide, gallium indium oxide, indium-gallium-zinc oxide, niobium-strontium-titanium oxide, indium cadmium oxide, BZO, SZO, indium oxide and combinations thereof.

11. A lithium-air battery comprising:
    a lithium negative electrode;
    a positive electrode;
    a separator provided therebetween; and
    an electrolyte,
    wherein the positive electrode is the positive electrode for a lithium-air battery of claim 1.

* * * * *